US006815038B2

(12) United States Patent
Morimoto et al.

(10) Patent No.: US 6,815,038 B2
(45) Date of Patent: Nov. 9, 2004

(54) HONEYCOMB STRUCTURE

(75) Inventors: Kenji Morimoto, Kasugai (JP);
Katsuhiro Inoue, Ama-gun (JP); Shinji Kawasaki, Nagoya (JP); Hiroaki Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 50 days.

(21) Appl. No.: 10/257,834

(22) PCT Filed: Feb. 25, 2002

(86) PCT No.: PCT/JP02/01672

§ 371 (c)(1),
(2), (4) Date: Oct. 18, 2002

(87) PCT Pub. No.: WO02/070433

PCT Pub. Date: Sep. 12, 2002

(65) Prior Publication Data

US 2003/0148063 A1 Aug. 7, 2003

(30) Foreign Application Priority Data

Mar. 2, 2001 (JP) ........................ 2001-057608

(51) Int. Cl.⁷ ................................ B32B 3/12
(52) U.S. Cl. ............... 428/116; 428/188; 428/34.4; 428/323; 428/325; 422/180; 422/211; 422/222; 55/523; 501/88; 501/89; 501/153; 501/154
(58) Field of Search ............... 428/116, 117, 428/118, 188, 34.4, 323, 325; 422/168, 177, 180, 211, 222; 55/523; 501/87, 88, 89, 153, 154

(56) References Cited

U.S. PATENT DOCUMENTS 5,070,050 A * 12/1991 Dupon et al.

2002/0088183 A1 * 7/2002 Manwiller et al.
2003/0110744 A1 * 6/2003 Gadkaree et al.

FOREIGN PATENT DOCUMENTS

| JP | A 60-186462 | 9/1985 |
| JP | A 61-26550 | 2/1986 |
| JP | A 5-213665 | 8/1993 |
| JP | A 6-182228 | 7/1994 |
| JP | B2 8-13706 | 2/1996 |
| JP | A 8-165171 | 6/1996 |
| JP | A 9-183658 | 7/1997 |

* cited by examiner

Primary Examiner—Deborah Jones
Assistant Examiner—Wendy Boss
(74) Attorney, Agent, or Firm—Oliff & Berridge, PLC

(57) ABSTRACT

A honeycomb structure constituted by
  cell partition walls (ribs) which form combined cells being composed of a plurality of cells adjacent to each other, and
  a honeycomb outer wall surrounding and holding outermost cells located at the circumference of combined cells,
characterized in that cell partition walls and the honeycomb outer wall are formed by a bonded texture containing silicon carbide (SiC) as an aggregate and cordierite as a binder, and that the proportion (volume %) of silidon carbide (SiC) forming the bonded texture to the total of cordierite and silicon carbide (SiC) is 40 to 90%. This honeycomb structure can exceed required levels, in all of thermal conductivity, chemical durability, low thermal expansion and mechanical strength, producible at a low cost, and suitably used in a filter for purification of automobile exhaust gas, a catalyst carrier, etc.

3 Claims, No Drawings

HONEYCOMB STRUCTURE

TECHNICAL FIELD

The present invention relates to a honeycomb structure. More particularly, the present invention relates to a honeycomb structure which has a quality higher than a required level, in all of thermal conductivity, chemical durability, low thermal expansion and mechanical strength, which can be produced at a low cost, and which is suitably used in a filter for purification of automobile exhaust gas, a catalyst carrier, etc.

BACKGROUND ART

As a filter for capturing and removing the particulate substance contained in a particle-containing fluid such as diesel engine exhaust gas, or as a catalyst carrier for loading thereon a catalyst component which purifies the harmful substance present in an exhaust gas, there is in wide use a porous honeycomb structure constituted by cell partition walls (ribs) which form combined cells being composed of a plurality of cells being adjacent to each other and a honeycomb outer wall which surrounds and holds the outermost cells located at the circumference of the combined cells. Refractory silicon carbide (SiC) is in use as the material constituting the honeycomb structure.

As such a honeycomb structure, there is disclosed, for example, a porous silicon carbide-based catalyst carrier of honeycomb structure obtained by using, as a starting material, a silicon carbide powder having a given specific surface area and containing impurities, molding the powder into a desired shape, drying the molded material and firing it in a temperature range of 1,600 to 2,200° C. (JP-A-6-182228).

There are also disclosed a process for producing a vitrifying material-containing refractory, characterized by adding a vitrifying material to an easily oxidizable material or a refractory composition containing an easily oxidizable material, mixing and kneading them together with a binder, molding the puddle, and open-firing the molded material in an oven of a non-oxidizing atmosphere, and a silicon carbide molded material obtained by adding, to a silicon carbide powder, an organic binder and an inorganic binder of clay mineral type, vitreous type or lithium silicate type and molding the mixture (JP-A-61-26550 and JP-A-8-165171). Incidentally, in JP-A-8-165171 is disclosed, as a conventional process for producing a porous silicon carbide-based sintered material, a process which comprises adding, to silicon carbide particles as an aggregate, a vitreous flux or a binder such as clayey material or the like, molding the mixture, and firing the molded material at a temperature at which the molded material is melted by the binder.

Further, there is disclosed a cordierite-based composite material wherein plate-like silicon carbide is allowed to be present in a cordierite-based matrix in an amount of 5 to 40% by weight based on the total of the two materials (JP-A-5-213665).

In case of the sintering (necking) caused by a recrystallization reaction of silicon carbide powder per se in the catalyst carrier disclosed in JP-A-6-182228, a silicon carbide component vaporizes from the surfaces of silicon carbide particles and condenses at the contact areas (neck) between the particles; as a result, the necks grow and resultantly a bonded state is obtained. However, the vaporization of silicon carbide requires a very high firing temperature, which incurs a high cost, requires high-temperature firing of a material high in thermal expansion coefficient. Thus, there is a problem that the yield in firing is reduced, thereby. Further, in the above-mentioned sintering by recrystallization of silicon carbide powder per se to produce a filter of high porosity, particularly a filter having a porosity of 50% or more, the sintering mechanism does not function sufficiently; as a result, the growth of necks is prevented and there has been a problem caused thereby, of reduced filter strength. Furthermore, the above-mentioned material is advantageous in that it has a very high thermal conductivity of 30 W/m·k or more and suppresses local heating; however, when the material is used in, for example, a catalyst-loaded filter of continuous regeneration type in which deposited particulates are oxidized and burnt, the deposition amount of particulates is small, release of heat is easy, accordingly a long time is required before the carrier is heated and a long time is required before the catalyst reaches its function-exhibiting temperature, and, therefore, there have been problems, for example, in that cinders of particulates remain and the efficiency of regeneration drops.

Also in the method of bonding a silicon carbide powder as a material with a vitreous material, disclosed in JP-A-61-26550 and JP-A-6-182228, the firing temperature may be as low as 1,000 to 1,400° C.; however, when the sintered material produced by the method is used, for example, as a material for a diesel particulate filter (DPF) which removes the particulates contained in an exhaust gas emitted form a diesel engine and when the particulates captured by and deposited on the filter are burnt for filter regeneration, the material is low in thermal conductivity and high in thermal expansion coefficient; therefore, there have been problems of easy local heating and low thermal shock resistance.

Also in the composite material and production process disclosed in JP-B-8-13706, the composite material can be obtained as a porous material; however, when it is used as a filter, it is not easy to allow the filter to have a sufficient porosity and it has been difficult to use the composite material particularly as a filter for capturing and removing the particulate substance contained in a particle-containing fluid such as diesel engine exhaust gas.

Further, the cordierite-based composite material disclosed in JP-A-5-213665 is somewhat effective for improvement of creep property and shock resistance; however, the composite material is low in silicon carbide content and has not been fully satisfactory in thermal conductivity and chemical durability.

The present invention has been made in view of the above-mentioned problems, and aims at providing a honeycomb structure which has a quality higher than a required level, in thermal conductivity, chemical durability, low thermal expansion and mechanical strength, which can be produced at a low cost, and which is suitably used in a filter for purification of automobile exhaust gas, a catalyst carrier, etc.

DISCLOSURE OF THE INVENTION

The present inventors made a study in order to achieve the above aim. As a result, the present inventors found out that by considering that silicon carbide and cordierite each have strengths and weaknesses, that is, silicon carbide is superior in high thermal conductivity and high chemical durability but is high in Young's modulus relative to strength as well as in thermal expansion coefficient, resulting in insufficient thermal shock resistance, while cordierite is superior in low thermal expansion and low cost but is insufficient in low thermal conductivity and low melting point, the material constituting the cell partition walls, etc. of honeycomb structure is allowed to contain silicon carbide and cordierite in such optimum proportions as their strong points are utilized and their weak points are made up for, whereby the above aim can be achieved. The present invention has been completed based on the finding.

According to the present invention there is provided the following honeycomb structure.

[1] A honeycomb structure constituted by
cell partition walls (ribs) which form combined cells being composed of a plurality of cells being adjacent to each other, and
a honeycomb outer wall which surrounds and holds the outermost cells located at the circumference of the combined cells,
characterized in that the cell partition walls and the honeycomb outer wall are formed by a bonded texture containing silicon carbide (SiC) as an aggregate and cordierite as a binder and that the proportion (volume %) of the silicon carbide (SiC) forming the bonded texture to the total of the cordierite and the silicon carbide (SiC) is 35 to 90%.

[2] A honeycomb structure according to the above [1], wherein the silicon carbide (SiC) is particulate and contains coarse particles having an average particle diameter of 5 μm or more and fine articles having an average particle diameter of below 5 μm and the proportion (volume %) of the fine particles to the total of the fine particles and the cordierite is 50% or less.

[3] A honeycomb structure according to the above [2], wherein the proportion (volume %) of the fine particles to the total of the fine particles and the coarse particles is 50% or less.

BEST MODE FOR CARRYING OUT THE INVENTION

Embodiments of the honeycomb structure of the present invention are specifically described below. However, the present invention is not restricted to these embodiments.

The honeycomb structure of the present invention is constituted by cell partition walls (ribs) which form combined cells being composed of a plurality of cells being adjacent to each other, and a honeycomb outer wall which surrounds and holds the outermost cells located at the circumference of the combined cells, and is characterized in that the cell partition walls and the honeycomb outer wall are formed by a bonded texture containing silicon carbide (SiC) as an aggregate and cordierite as a binder and that the proportion (volume %) of the silicon carbide (SiC) forming the bonded texture to the total of the silicon carbide (SiC) and the cordierite is 40 to 90%.

Here, the appropriate proportion (volume %) of silicon carbide (SiC) varies depending upon its shape and size and therefore the optimum value is not easily derivable. However, its range is 35 to 90%, preferably 50 to 80%. If a proportion is below 35%, it has an insufficient thermal conductivity and insufficient chemical durability. When the proportion exceeds 90%, the content of cordierite as binder is short and its strong points can not be utilized sufficiently, resulting in insufficient (high) thermal expansion, an insufficient mechanical strength and a high cost.

In the honeycomb structure of the present invention, its cell partition walls and honeycomb outer wall are formed by a bonded texture containing silicon carbide (SiC) as an aggregate and cordierite of relatively low melting point as a binder for bonding silicon carbide (SiC). Therefore, in production of the honeycomb structure, sintering can be conducted at a relatively low firing temperature, making it possible to reduce the production cost and increase the yield.

Further, since the proportion (volume %) of silicon carbide (SiC) to the total of silicon carbide (SiC) and cordierite is set as high as 35 to 90%, the high thermal conductivity of silicon carbide (SiC) which is its strong point, can be utilized well and, when the honeycomb structure is used in, for example, a DPF and the particulates deposited on the filter are burnt for filter regeneration, there arises no such local heating as to damage the filter.

In this case, the thermal conductivity of SiC is preferably 5 W/m·K or more in order to avoid the above-mentioned local heating.

Further, in order to secure a sufficient porosity, the honeycomb structure of the present invention preferably has, as its fine structure, a bonded texture wherein silicon carbide (SiC) is bonded by cordierite in a state that the particle shape of SiC material is retained. The porosity of the present honeycomb structure is preferably 30 to 90% particularly when the honeycomb structure is used as a filter for capturing and removing the particulate substance contained in a particle-containing fluid. If the porosity of the honeycomb structure is below 30%, it would show an insufficient filtration speed. And, if the porosity exceeds 90%, the structure would show insufficient strength. When the honeycomb structure of the present invention is used in applications (e.g. a filter for purification of automobile exhaust gas) where pressure loss is feared, the porosity is preferably 40% or more. When the present honeycomb structure is used as a filter in which pressure loss need be kept low, for example, a filter in which a catalyst is loaded and the deposited particulates are burnt continuously, the porosity and thermal conductivity are preferably 50 to 90% and 5 to 30 W/m·K, respectively, more preferably 50 to 80% and 7 to 28 W/m·K, respectively, particularly preferably 53 to 70% and 9 to 25 W/m·K, respectively.

When the honeycomb structure is used as a filter on which a catalyst is loaded, catalyst loading invites an increase in pressure loss and, therefore, the porosity is preferably set as high as 40 to 90%. In this type of filter, when the porosity is below 40%, the pressure loss may be too large. A porosity exceeding 90% may result in a structure of insufficient strength.

Further when the honeycomb structure is used as the above-mentioned type of filter on which a catalyst is loaded, a non-uniform temperature distribution appears owing to local heating, which gives rise to local generation of stress in filter; therefore, this local heating need be suppressed. Accordingly, when the thermal conductivity is below 5 W/m·K, effective suppression of local heating may be difficult. Meanwhile, when the thermal conductivity exceeds 30 W/m·K, the temperature increase of filter becomes difficult due to the high effect for releasing heat, and small amount of deposited particulates, etc. Consequently, a long time is required in order to increase a temperature of the catalyst up to a temperature at which it shows its function, and some of particulates are apt to remain unburned, and thereby the efficiency of filter regeneration may decrease In the present invention, "catalyst loaded on filter" refers to a catalyst used for oxidation and combustion of particulates and decomposition of $NO_x$. There can be specifically mentioned noble metals such as platinum, palladium, rhodium, iridium, silver and the like; oxides such as alumina, zirconia, titania, ceria, iron oxide and the like; and so forth.

The silicon carbide (SiC) used in the honeycomb structure of the present invention is particulate and has an average particle diameter of preferably 5 μm or more. When the average particle diameter is below 5 μm, the porosity may be insufficient. When the present honeycomb structure is used, in particular, as a filter, for example, a DPF for capturing and removing the particulates contained in an exhaust gas emitted from a diesel engine, such a porosity is insufficient and, therefore, the pressure loss may increase significantly even when the deposition amount of particulates is small.

In the present invention, it is also preferred that the silicon carbide (SiC) particles contain coarse particles having an average particle diameter of 5 μm or more and fine articles having an average particle diameter of beyond 5 μm and the proportion (volume %) of the fine particles to the total of the fine particles and cordierite is 50% or less. When the proportion of the fine particles exceeds 50%, cordierite is consumed to wet the fine particles and the cordierite amount necessary for necking between the coarse particles to function as an aggregate is short; as a result, dispersion of fine particles into bonded tissue is insufficient and it may be impossible to obtain a sufficient porosity.

In the present invention, it is also preferred that the proportion (volume %) of fine particles to the total of fine particles and coarse particles is 50% or less. When the proportion of fine particles is small, there may be some adverse effect because the resulting thermal conductivity is low; however, sufficient properties can be obtained in order for the honeycomb structure to be suitably used as a filter for purification of automobile exhaust gas, a catalyst carrier or the like. Meanwhile, when the proportion of fine particles exceeds 50%, cordierite is used to wet fine particles, the cordierite amount necessary for necking between the coarse particles to function as an aggregate is short, and it may be impossible to obtain a porosity and pore diameter sufficient for proper functioning of filter.

In the honeycomb structure of the present invention, there is no particular restriction as to the thickness of cell partition walls (ribs) which form combined cells. However, the thickness is preferably 4 mil (102 μm) or more. When the thickness of cell partition walls (ribs) is below 4 mil (102 μm), the structure may be insufficient in structure. When the structure is used particularly as a filter such as DPF or the like, the thickness of cell partition walls (ribs) is preferably 50 mil (1270 μm) or less. When the thickness exceeds 50 mil (1270 μm), a shortage in filtration speed and a rise in pressure loss may be incurred.

In the honeycomb structure of the present invention, the cell density, (i.e., numbers of cells per unit area of the cross-sectional plane which is perpendicular to intersecting lines of the cell partition walls), is preferably in a range of 5 to 1,000 cells/in.$^2$ (0.7 to 155 cells/cm$^2$). When the cell density is below 5 cells/in.$^2$ (0.7 cells/cm$^2$), the honeycomb structure is short in strength and, when used as a filter, in filtration area as well. When the cell density exceeds 1,000 cells/in.$^2$ (155 cells/cm$^2$), too large a rise in pressure loss may be incurred.

Description is made below on the process for producing the honeycomb structure of the present invention.

In producing the honeycomb structure of the present invention, first, there are added, to a silicon carbide (SiC) material, a cordierite material and, as necessary, an organic binder and water. They are mixed and kneaded to obtain a puddle for molding.

Incidentally, the materials used may contain impurities such as Fe, Al, Ca and he like. They may be used per se, or may be purified by subjecting to a chemical treatment such as cleaning with chemical, or the like.

The average particle diameter of silicon carbide (SiC) particles may be 5 μm or more as mentioned previously, preferably 10 to 100 μm. When the average particle diameter is 5 μm or more, a desired porosity and pore diameter can be obtained easily. That is, since cordierite can make mass transfer with relative easiness during firing, porosity and pore diameter can be controlled without being greatly affected by the level of the average particle diameter of silicon carbide (SiC).

Further, the bonded texture containing silicon carbide (SiC) and cordierite, of the present invention has a mechanical strength same as or higher than that of recrystallized SiC. Accordingly, the bonded texture can retain its strength even when the bonded texture is in such a state that silicon carbide (SiC) particles of small average particle diameter are bonded by cordierite in a thin and long shape to form large pores, or even when the bonded texture is a thin-wall structure such as honeycomb structure.

Further, in a conventional porous honeycomb structure using recrystallized SiC, there are required, for its reaction mechanism, silicon carbide (SiC) particles (as an aggregate material) having an average particle diameter nearly same as the pore diameter desired for honeycomb structure. In contrast, in the honeycomb structure of the present invention, any silicon carbide (SiC) particles to be bonded by cordierite may be used, as far as the average particle diameter thereof is 5 μm or more. Therefore, an inexpensive material can be used in order to attain the same pore diameter; thus, a reduction in production becomes possible since a raw material can be selected from a wide range.

There is no particular restriction as to the upper limit of the average particle diameter of silicon carbide (SiC) material. However, When the average particle diameter exceeds 100 μm, the moldability into a honeycomb structure may be insufficient.

The cordierite used in the present invention melts during firing, to wet the surfaces of silicon carbide (SiC) particles and has a role of bonding the particles with each other.

As the material for cordierite, a cordierite powder may be used, or natural materials such as talc, kaolin clay, alumina and the like ordinarily used industrially may be used.

The appropriate addition amount thereof varies depending upon the average particle diameter and particle shape of silicon carbide (SiC). However, the amount is preferably in a range of 10 to 65% by volume based on the total of silicon carbide (SiC) and cordierite. When the amount is below 10%, the binder is short, making it impossible to obtain a strength which can maintain a thin-wall structure such as honeycomb structure. When the amount exceeds 65%, cordierite is present in an amount beyond required for appropriate bonding between silicon carbide (SiC) particles, which may incur problems such as reduction in porosity, decrease in average pore diameter, and the like.

In order to smoothly extrude, into a honeycomb shape, a puddle obtained by compounding silicon carbide (SiC) as an aggregate, cordierite and, as necessary, a pore-forming agent, etc., it is preferred to add at least one kind of organic binders, as a molding aid, in an amount of 2% by volume or more as a superaddition to the total amount of the main materials [silicon carbide (SiC) and cordierite]. However, the addition in an amount exceeding 30% makes too high the porosity after calcination and may invite a shortage in strength.

The organic binder is added in a range of preferably 4 to 20% when extrusion is made into a honeycomb structure having a cell partition wall thickness of 20 mil (508 μm) or less. When the addition amount is below 4%, extrusion into a thin-wall shape is difficult; when the addition amount exceeds 20%, shape retention after extrusion may be difficult.

When the honeycomb structure is used as a filter, a pore-forming agent may be added at the time of preparing a puddle, in order to obtain an increased porosity. The addition amount (volume %) of the pore-forming agent is preferably 30% or less as a superaddition to the total amount of the main materials [silicon carbide (SiC) and cordierite]. If addition amount exceeds 30%, the porosity becomes too large, and the strength becomes insufficient.

Addition of the pore-forming agent is preferred also when a honeycomb structure having a high porosity of 50% or more is produced. By appropriately selecting the kind, average particle diameter, etc. of the pore-forming agent used, it is possible to produce a honeycomb structure having a controlled pore diameter distribution and a high porosity. That is, in the present invention, the gaps between particles of silicon carbide (SiC) (an aggregate) become pores; by adding a pore-forming agent having an average particle diameter of 1.2 to 4 times that of silicon carbide (SiC) (an aggregate), there can be produced a honeycomb structure of high porosity, having a pore diameter distribution consisting of two pore diameter distributions of the gaps between silicon carbide (SiC) particles and the spaces formed by burning of pore-forming agent. Therefore, flexible designing of materials corresponding to required pore diameter distribution is possible by appropriately selecting the average particle diameters of silicon carbide (SiC) and pore-forming agent.

Meanwhile, even in using silicon carbide (SiC) and cordierite both having a large average particle diameter to produce a honeycomb structure of large pore diameters, smooth extrusion of puddle is possible by adding an appropriate amount of a pore-forming agent having an average particle diameter of 0.5 time or less that of silicon carbide (SiC). Thus, a honeycomb structure of high porosity can be produced without reducing moldability.

There is no particular restriction as to the kind of the pore-forming agent used as necessary. However, there can be mentioned, for example, graphite, wheat flour, starch, phenolic resin, polymethyl methacrylate, polyethylene and polyethylene terephthalate. The pore-forming agent may be used in one kind or in combination of two or more kinds, depending upon the addition purpose.

The puddle obtained by mixing and kneading of the above-mentioned raw materials according to an ordinary method is subjected to extrusion or the like to obtain a molded material of desired honeycomb shape. The molded material is calcinated for removal (debinding) of the organic binder contained in the molded material, followed by firing. The calcination is conducted preferably at a temperature below the temperature at which cordierite melts. Specifically, the calcination may be conducted by once keeping the molded material at a given temperature of about 300 to 600° C., or by using a slow temperature elevation rate of 50° C./h or less in a given temperature range.

In the calcination by once keeping the molded material at a given temperature, keeping only at one temperature level or at a plurality of temperature levels is possible depending upon the kind and amount of the organic binder used; when keeping is made at a plurality of temperature levels, the time lengths of keeping may be the same or different. Similarly, in the calcination by using a slow temperature elevation rate, the slow temperature elevation rate may be used only in one temperature range or in a plurality of temperature ranges; when the slow temperature elevation rate is used in a plurality of temperature ranges, the temperature elevation rates may be the same or different.

The atmosphere of calcination may be an oxidizing atmosphere. However, when the molded material contains an organic binder in a large amount, the organic binder burns vigorously in the presence of oxygen during calcination, resulting in sharp increase in molded material temperature; therefore, calcination is conducted preferably in an inert atmosphere such as $N_2$, Ar or the like to suppress the abnormal temperature increase of molded material. This suppression of abnormal temperature increase is particularly preferred when raw materials of large thermal expansion coefficient (low thermal shock resistance). When the organic binder is added in an amount of, for example, 20% by volume or more based on the main raw materials, calcination is conducted preferably in the above-mentioned inert atmosphere.

Calcination and subsequent firing may be conducted in different steps in one or different furnaces, or continuously in one furnace. The former operation is preferred as well when calcination and firing are conducted in different atmospheres; however, the latter operation is preferred from the standpoint of total firing time, furnace running cost, etc.

Cordierite need be softened in order to obtain a texture in which silicon carbide (SiC) is bonded by cordierite. Since cordierite melts at about 1,400° C., the firing temperature is preferably 1,400° C. or more. The optimum firing temperature is determined based on the fine structure and properties. However, the firing temperature is preferably 1,400 to 1,500° C. because at temperatures above 1,800° C., the vaporization of cordierite proceeds and the bonding via cordierite is difficult.

Incidentally, in the above-mentioned production process using recrystallization, disclosed in JP-A-6-182228, bonding between silicon carbide (SiC) particles takes place and resultantly a sintered material of high thermal conductivity can be obtained. However, as described previously, sintering is conducted by a mechanism of vaporization and condensation, that is, silicon carbide (SiC) is vaporized; therefore, there is needed a firing temperature higher than required in production of the honeycomb structure of the present invention and, in order to obtain a silicon carbide (SiC) sintered material of practical applicability, a high firing temperature of at least 1,800° C. or more, ordinarily 2,000° C. or more is needed.

As to the atmosphere used in firing, it is preferred to use a non-oxidizing atmosphere such as $N_2$, Ar or the like. Incidentally, in production of the honeycomb structure of the present invention, since property deterioration caused by the nitriding of material does not take place during firing, inexpensive $N_2$ can be used, making possible a reduction in production cost.

The present invention is described more specifically below by way of Examples. However, the present invention is in no way restricted by these Examples.

EXAMPLES 1 to 9 AND COMPARATIVE EXAMPLES 1 to 2

There were compounded a silicon carbide (SiC) powder as a silicon carbide material and a cordierite material, that is, a sherd (containing cordierite as the crystalline phase) obtained by grinding a cordierite fired material or green materials (talc, kaolin clay and alumina), so as to give a composition shown in Table 1. To 100 parts by mass of the resulting powder were added 6 parts by mass of methylcellulose (as an organic binder), 2.5 parts by mass of a surfactant and 24 parts by mass of water. They were mixed and kneaded uniformly to obtain a puddle for molding. The puddle was subjected to extrusion molding using an extruder to form a honeycomb molded material having an outer diameter of 45 mm, a length of 120 mm, a cell partition wall thickness of 0.43 mm and a cell density of 100 cells/in.$^2$ (16 cells/cm$^2$). This honeycomb molded material was calcinated for debinding in an oxidizing atmosphere at 550° C. for 3 hours and then fired in a non-oxidizing atmosphere at 1,400° C. for 2 hours to produce a silicon carbide sintered material of porous honeycomb structure. The crystalline phase thereof was examined by X-ray diffraction, which confirmed that the sintered material was composed of silicon carbide (SiC) and cordierite.

The sintered materials obtained in Examples 1 to 9 and Comparative Examples 1 to 2 were measured for properties, thermal conductivity, chemical durability, low thermal expansion and mechanical strength according to the following methods.

Porosity: measured by an Archimedes method.

Average pore diameter: measured using a mercury porosimeter.

Thermal conductivity: measured by a laser flush method.

Thermal expansion coefficient: measured by a differential thermal expansion method.

Bending strength: four-point bending strength at room temperature was measured by JIS R 1601.

Weight increase by oxidation: an increase in weight after treatment in the air at 1,200° C. for 24 hours was measured.

Anti-ash properties: an ash collected from a diesel engine operated actually was deposited on a test piece. The resulting test piece was treated at 1,300° C. for 30 minutes, and the presence or absence of the reaction (melt down) was examined by fine structure observation using a scanning type electron microscope (SEM).

The followings are appreciated from Table 1.

From the results of Example 1 (SiC proportion: 90%), Example 2 (SiC proportion: 60%), Example 3 (SiC proportion: 40%), Comparative Example 1 (SiC proportion: 95%) and Comparative Example 2 (SiC proportion: 30%), it is appreciated that in Comparative Example 1 where the proportion of SiC exceeded 90%, the thermal expansion coefficient becomes the same as or larger than that of SiC and it loses an advantage over the conventional SiC materials. It is also appreciated that in Comparative Example 2 where the proportion of SiC was below 35%, the porosity is below 30% and the function as a filter is insufficient.

As to the cordierite material, it is appreciated that as shown in Examples 4 and 6 to 9, by changing sherd to green materials (alumina, kaolin and talc), a texture showing good wetting to SiC particles (an aggregate) is formed, pore diameter is increased and thermal conductivity is increased slightly.

It is also appreciated that the sintered materials obtained in Examples 1 to 9 have a quality higher than specified, also in bending strength (which is an indication of mechanical strength) and weight increase by oxidation and resistance to ash reactivity (these are indications of chemical durability).

Industrial Applicability

As described above, the present invention provides a honeycomb structure which has a quality higher than the required level, in all of thermal conductivity, chemical durability, low thermal expansion and mechanical strength, which can be produced at a low cost, and which is suitably used in a filter for purification of automobile exhaust gas, a catalyst carrier, etc.

TABLE 1

| Exam or Com. Exam. | SiC Proportion (vol. %) | SiC Particle diameter [Fine particles] (μm) | Cordierite Proportion (vol. %) | Proportion of SiC fine particles to (SiC coarse particles + SiC fine particles) (vol. %) | Proportion of SiC fine particles to (Cordierite particle + SiC fine particles) (vol. %) | Porosity (%) | Pore diameter (μm) | Thermal expansion co-efficient ($10^{-6}$/K) | Thermal conductivity (W/m · K) | Bending strength (MPa) | Weight increase by oxidation (%) | Anti-ash properties |
|---|---|---|---|---|---|---|---|---|---|---|---|---|
| Ex. 1 | 90 | 32 | 10 | — | — | 46 | 8 | 4.2 | 7 | 28 | 3 | No |
| Ex. 2 | 60 | 32 | 40 | — | — | 40 | 7 | 3.9 | 6 | 44 | 3 | No |
| Ex. 3 | 40 | 32 | 60 | — | — | 38 | 6 | 3.9 | 6 | 53 | 3 | No |
| Ex. 4 | 60 | 32 | 40 | — | — | 35 | 9 | 4.0 | 8 | 42 | 3 | No |
| Ex. 5 | 60 | 7 | 40 | — | — | 40 | 6 | 4.0 | 6 | 44 | 4 | No |
| Ex. 6 | 70 | 10 [3] | 30 | 14 | 25 | 34 | 6 | 4.0 | 12 | 66 | 4 | No |
| Ex. 7 | 80 | 10 [3] | 20 | 25 | 50 | 34 | 5 | 4.0 | 9 | 55 | 4 | No |
| Ex. 8 | 70 | 20 [3] | 30 | 14 | 25 | 35 | 6 | 4.0 | 9 | 63 | 4 | No |
| Ex. 9 | 70 | 7 [0.7] | 30 | 14 | 25 | 36 | 5 | 4.0 | 9 | 63 | 4 | No |
| Comp. Ex. 1 | 95 | 32 | 5 | — | — | 47 | 8 | 4.4 | 7 | 20 | 5 | No |
| Comp. Ex. 1 | 30 | 32 | 70 | — | — | 28 | 3 | 3.0 | 6 | 60 | 4 | yes |

Talc, kaolin clay, & alumina, which are a green material, were used as a cordierite material in Examples 4, and 6 to 9.
[Fine particles] in the column of SiC particle diameter refers to the particle diameter of SiC fine particles.

What is claimed is:

1. A honeycomb structure constituted by cell partition walls (ribs) which form combined cells being composed of a plurality of cells being adjacent to each other, and a honeycomb outer wall which surrounds and holds the outermost cells located at the circumference of the combined cells, characterized in that the cell partition walls and the honeycomb outer wall are formed by a bonded texture containing silicon carbide (SiC) as an aggregate and cordierite as a binder and that the proportion (volume %) of the silicon carbide (SiC) forming the bonded texture to the total of the cordierite and the silicon carbide (SiC) is 35 to 90%.

2. A honeycomb structure according to claim 1, wherein the silicon carbide (SiC) is particulate and contains coarse particles having an average particle diameter of 5 $\mu$m or more and fine particles having an average particle diameter of below 5 $\mu$m and the proportion (volume %) of the fine particles to the total of the fine particles and the cordierite is 50% or less.

3. A honeycomb structure according to claim 2, wherein the proportion (volume %) of the fine particles to the total of the fine particles and the coarse particles is 50% or less.

* * * * *